(12) United States Patent
Mitsui et al.

(10) Patent No.: US 8,042,240 B2
(45) Date of Patent: Oct. 25, 2011

(54) MACHINE TOOL

(75) Inventors: Shingo Mitsui, Tochigi (JP); Shugo Arakawa, Tochigi (JP); Makoto Izumi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 947 days.

(21) Appl. No.: 12/017,517

(22) Filed: Jan. 22, 2008

(65) Prior Publication Data

US 2008/0178446 A1    Jul. 31, 2008

(30) Foreign Application Priority Data

Jan. 26, 2007  (JP) ................... 2007-016132
Jan. 26, 2007  (JP) ................... 2007-016134

(51) Int. Cl.
*B23Q 7/00* (2006.01)
(52) U.S. Cl. ............ 29/33 P; 29/281.1; 269/43; 269/45; 269/291; 409/224; 198/346.2; 198/463.3
(58) Field of Classification Search ................... 29/33 P, 29/563, 281.1; 269/43, 45, 291, 309–310; 198/346.2, 463.2, 463.3, 345.3, 346.1; 409/158–159, 409/161, 167, 172–173, 168, 219–227; 483/14–15
See application file for complete search history.

(56) References Cited

U.S. PATENT DOCUMENTS

| 4,025,064 A * | 5/1977 | Disston et al. ............... 269/87.3 |
| 4,773,811 A * | 9/1988 | Wasner ......................... 414/401 |
| 7,647,681 B1 * | 1/2010 | Harris et al. .................. 29/281.1 |

FOREIGN PATENT DOCUMENTS

| JP | 60-201807 | 10/1985 |
| JP | 61-5838 | 1/1986 |
| JP | 61-8636 | 1/1986 |
| JP | 63-32731 | 3/1988 |
| JP | 7-040180 | 2/1995 |
| JP | 7-164222 | 6/1995 |
| JP | 2000-317762 | 11/2000 |
| JP | 2002-120122 | 4/2002 |
| JP | 2002-210650 | 7/2002 |
| JP | 2002-254266 | 9/2002 |
| WO | WO 2005018875 A1 * | 3/2005 |

* cited by examiner

*Primary Examiner* — David Bryant
*Assistant Examiner* — Matthew Beisel
(74) *Attorney, Agent, or Firm* — Rankin, Hill & Clark LLP (57) ABSTRACT

A machine tool is provided with a machining unit, a base plate, an intermediate plate, a lower plate, and a pair of upper plates. The machining unit is fixed to a frame. The base plate is movable along a rail on the frame. The base plate moves a work piece toward and away from the machining unit. The intermediate plate is movable along the rail between the machining unit and the base plate. The intermediate plate pushes a reference plane of the work piece set on the base plate so that the work piece is positioned in a machining position. The lower plate is tiltably connected to the base plate and the upper plates are tiltably connected to the lower plate.

15 Claims, 6 Drawing Sheets

MACHINE TOOL

BACKGROUND OF THE INVENTION

1. Field of the Invention

The present invention relates to a machine tool suitable for a machining on a reference plane side of a work piece that has the reference plane on one surface and has no reference plane on the other surface (a surface on the opposite side)

2. Related Art

A transmission case has right and left half pieces. By combining the right and left half pieces, the transmission case becomes a product. Alignment surfaces between the right and left half pieces are used as reference planes for machining the respective right and left half pieces. Accordingly, each of half pieces has the reference plane on one surface and has no reference plane on the other surface (a surface on the opposite side). When a work piece having a reference plane on only one surface and no reference plane on the other surface is worked, the reference plane must be positioned precisely with respect to a machining axis.

Normally, as a mechanism relatively positioning a tool head and a fitting jig for supporting the workpiece, a positioning system for fitting a guide bar into a guide post is known. According to such system, there is a limit to a positioning precision because a clearance must be provided between the guide bar and the guide post. Also, there exists such a problem that a vibration caused in the work piece during the machining operation is readily transmitted to the tool.

In Patent Document 1, a horizontal-type machine tool constructed to eliminate a clearance between both members is disclosed. A guide bar movable back and forth and a linear guiding means for guiding the guide bar by pushing an outer peripheral surface of the guide bar are provided to a tool head side. A fastening means for holding/fixing the outer peripheral surface of the guide bar when compressed by a fluid pressure is provided to a fitting jig side, so that the clearance can be eliminated.

In Patent Document 2, a vertical-type machine tool in which a plurality of tool heads are vertically and horizontally moved by an inverting action of a rotation frame and a shifting action of a shift frame is disclosed. In the vertical-type machine tool, instead of using the relatively positioning system using the guide bar and the guide post, a system in which a tool head side is constructed as a dynamic structure and a fitting jig side is caused to follow the tool head side is used.

In Patent Document 3, a gimbal mechanism is disclosed as a mechanism for tiltably supporting a member with respect to an axis. A general structure of the gimbal mechanism has a convex spherical receiving portion provided on one member and a concave spherical receiving portion provided on the other member and slidably contact with the convex spherical receiving portion.

[Patent Document 1] JP-B2-2756406
[Patent Document 2] JP-B-63-65444
[Patent Document 3] JP-A-2002-210650

In the mechanism such as Patent Document 1 in which the guide bar on the tool head side is fixed by the fastening means of the fitting jig, the machine structure becomes complicated, a weight becomes heavy, and the relative positioning between both members is set up fixedly. Therefore, the vibration of the work piece is readily transmitted to the tool head side, and thus a burden is imposed on the edge, the gear, and the like on the tool head side.

Also, according to Patent Document 2, by structuring the tool head side as the dynamic structure, a burden imposed on the edge, the gear, and the like on the tool head side can be lessened. However, there is a limit to a machining precision.

Although Patent Document 3 discloses the gimbal mechanism, Patent Document 3 does not disclose or suggest a way of using the gimbal mechanism for simultaneously machining the pair of work pieces.

SUMMARY OF THE INVENTION

In accordance with one or more embodiments of the invention, a machine tool is provided with: a machining unit fixed to a frame; a base plate movable along a rail on the frame, for moving a work piece toward and away from the machining unit; and an intermediate plate movable along the rail between the machining unit and the base plate, for pushing a reference plane of the work piece set on the base plate and positioning the work piece in a machining position.

The machine tool may include: a pallet, wherein the work piece is supported on the pallet via a positioning pin; and a holding plate mechanism provided on the base plate, for tiltably supporting the pallet with respect to a machining axis.

Moreover, in accordance with one or more embodiments of the invention, a machine tool is provided with: a machining unit fixed to a frame; a base plate movable along a rail on the frame, for moving a work piece toward and away from the machining unit; and a holding plate mechanism provided on the base plate, for supporting a pallet on which the work piece is set. The holding plate mechanism includes a lower plate and a pair of upper plates. The lower plate is connected to the base plate via a first gimbal mechanism so as to be tiltable with respect to a machining axis. The pair of upper plates are respectively connected to the lower plate via second gimbal mechanisms so as to be tiltable with respect to the machining axis.

The machine tool may include a lock mechanism provided between the base plate and the lower plate, for locking a movement of the lower plate.

The machine tool may include a positioning pin penetrating through and supported by the pallet via a retaining mechanism.

According to the machine tool of the embodiments, positioning of a pair of pieces can be simultaneously carried out, and machining of the pair of pieces can be individually carried out. For example in a transmission case, the transmission case is completed as a product by fitting right and left half pieces on reference planes. It is considered that a plurality of right half pieces are continuously machined, then a plurality of left half pieces are continuously machined, and finally respective right and left half pieces are assembled. However, in casting products, casting conditions may vary and shrinkage ratios may differ in accordance with products. Therefore, it is preferable that the pair of pieces are machined under the same condition. According to the machine tool of the embodiments, the pair of work pieces can be machined under the same condition.

According to the machine tool of the embodiments, even if the pair of work pieces are set on a single pallet, each of the work pieces is individually arranged on right or left upper plates via the positioning pins, so that the each of the work pieces can independently tilt.

According to the machine tool of the embodiments, a machining precision can be maintained highly and at the same time a burden on the tool unit side can be lessened, and in addition a reduction in weight of the machine can be achieved. Also, such a disadvantage can be suppressed that the vibration of the work piece is transmitted to the tool side in the cutting, and the like. Therefore, a burden imposed on the machining unit side can be lessened.

Other aspects and advantages of the invention will be apparent from the following description and the appended claims.

DETAILED DESCRIPTION OF THE EXEMPLARY EMBODIMENT

Figure 1:
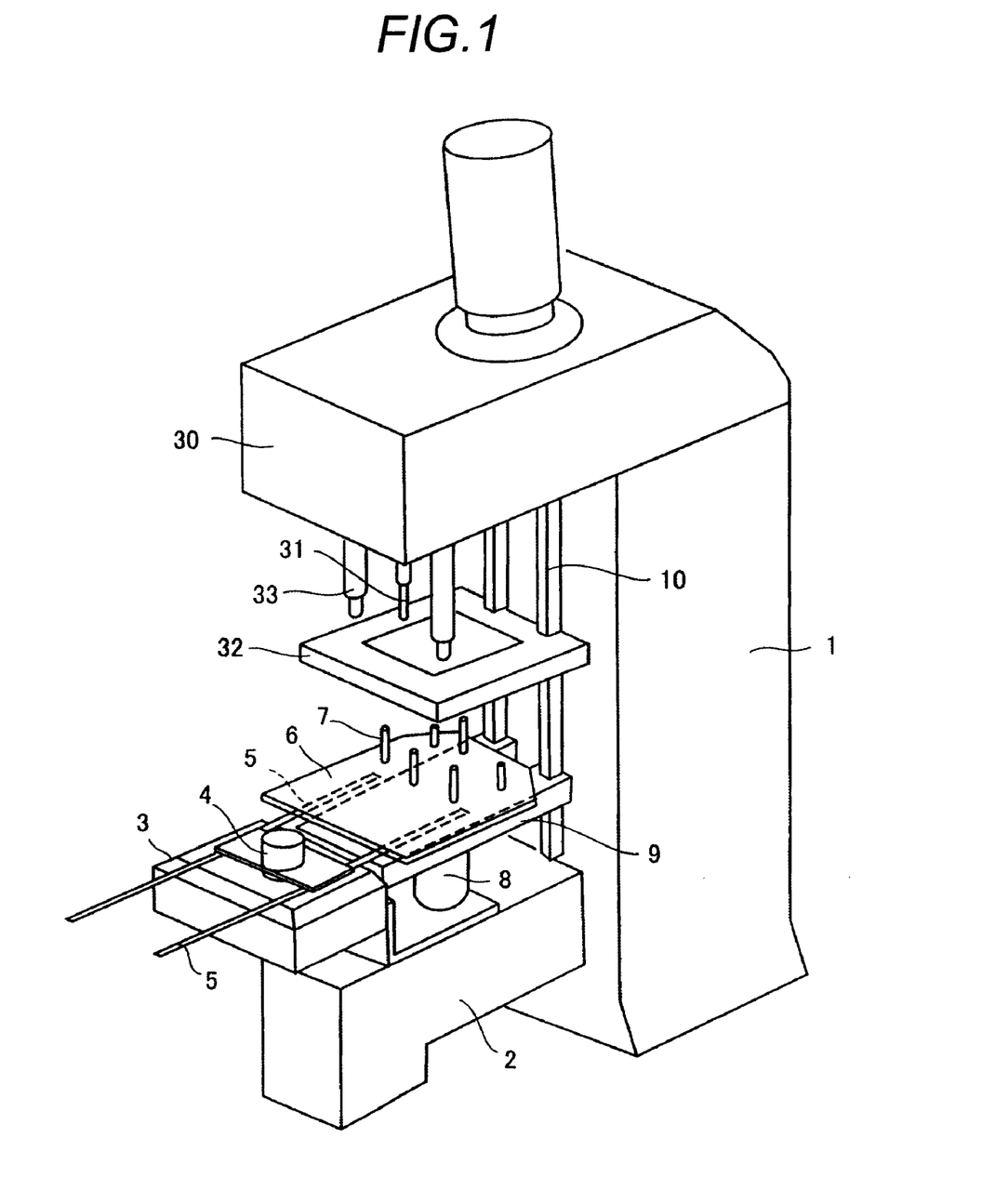
[FIG. 1] A general perspective view of a machine tool according to the present invention.
Figure 2:
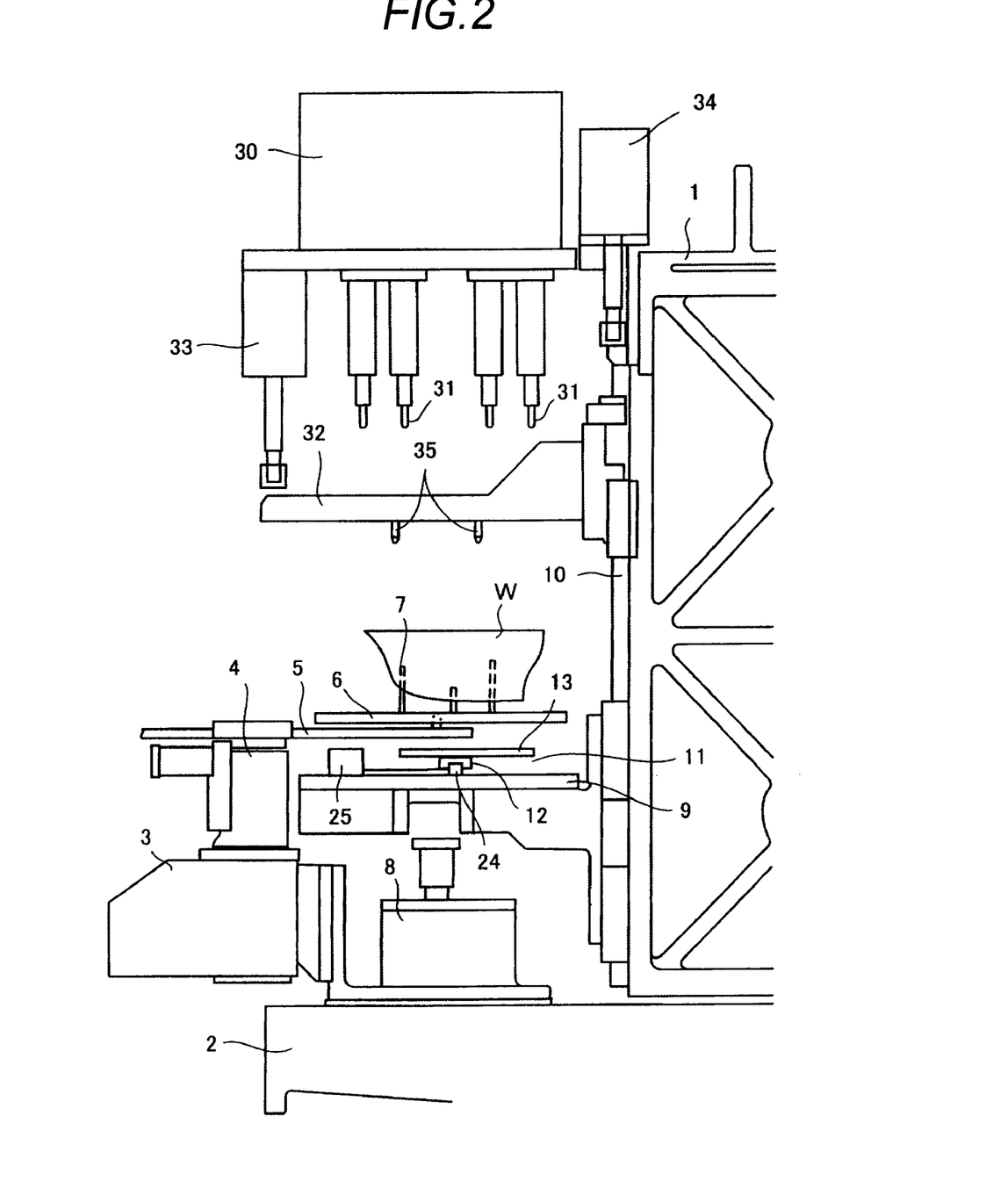
[FIG. 2] A side view of the machine tool in a standby state.
Figure 3:
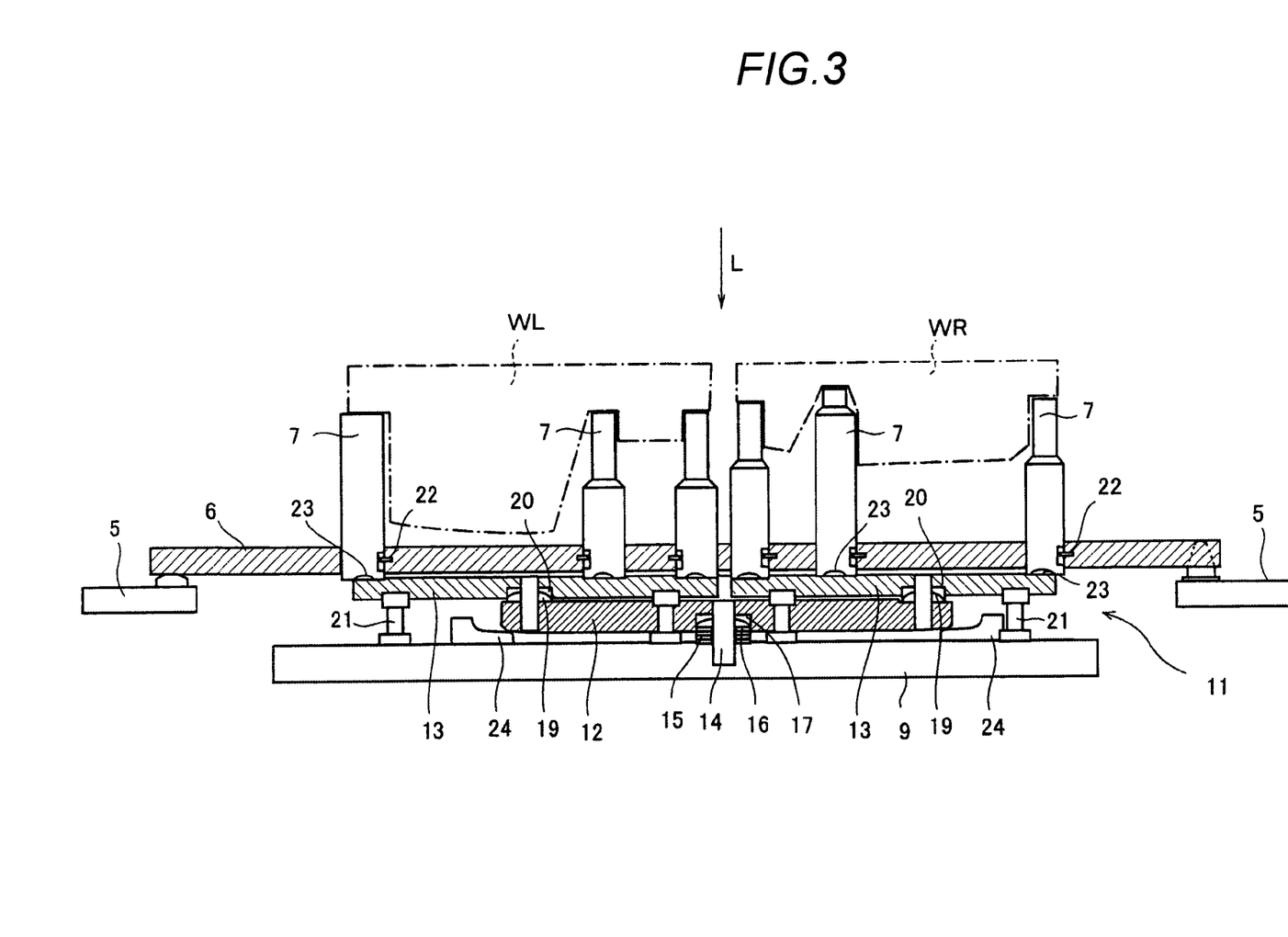
[FIG. 3] An enlarged view showing a state that a pallet is set to a base plate.
Figure 4:
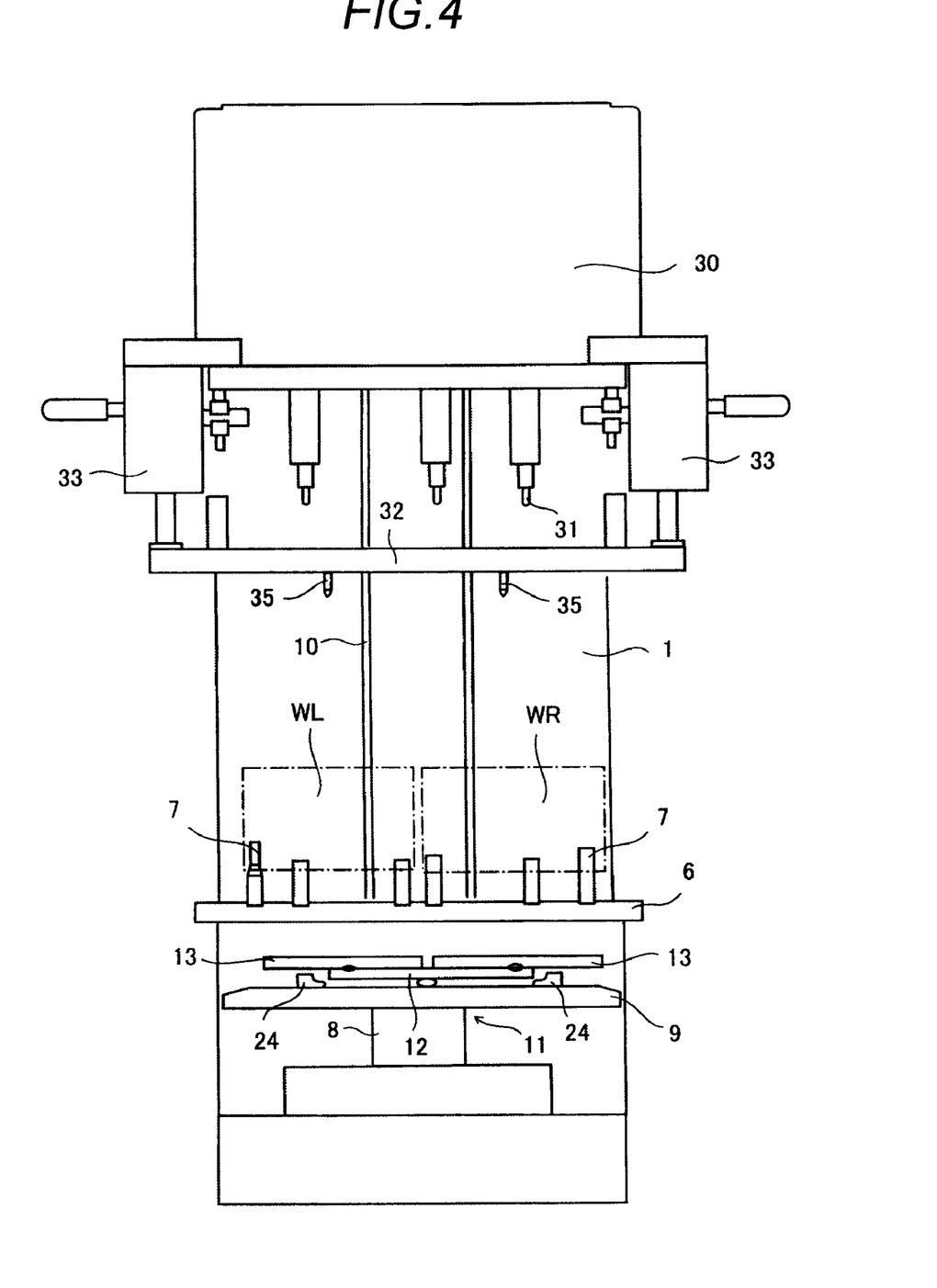
[FIG. 4] A front view of the machine tool in a standby state.
Figure 5:
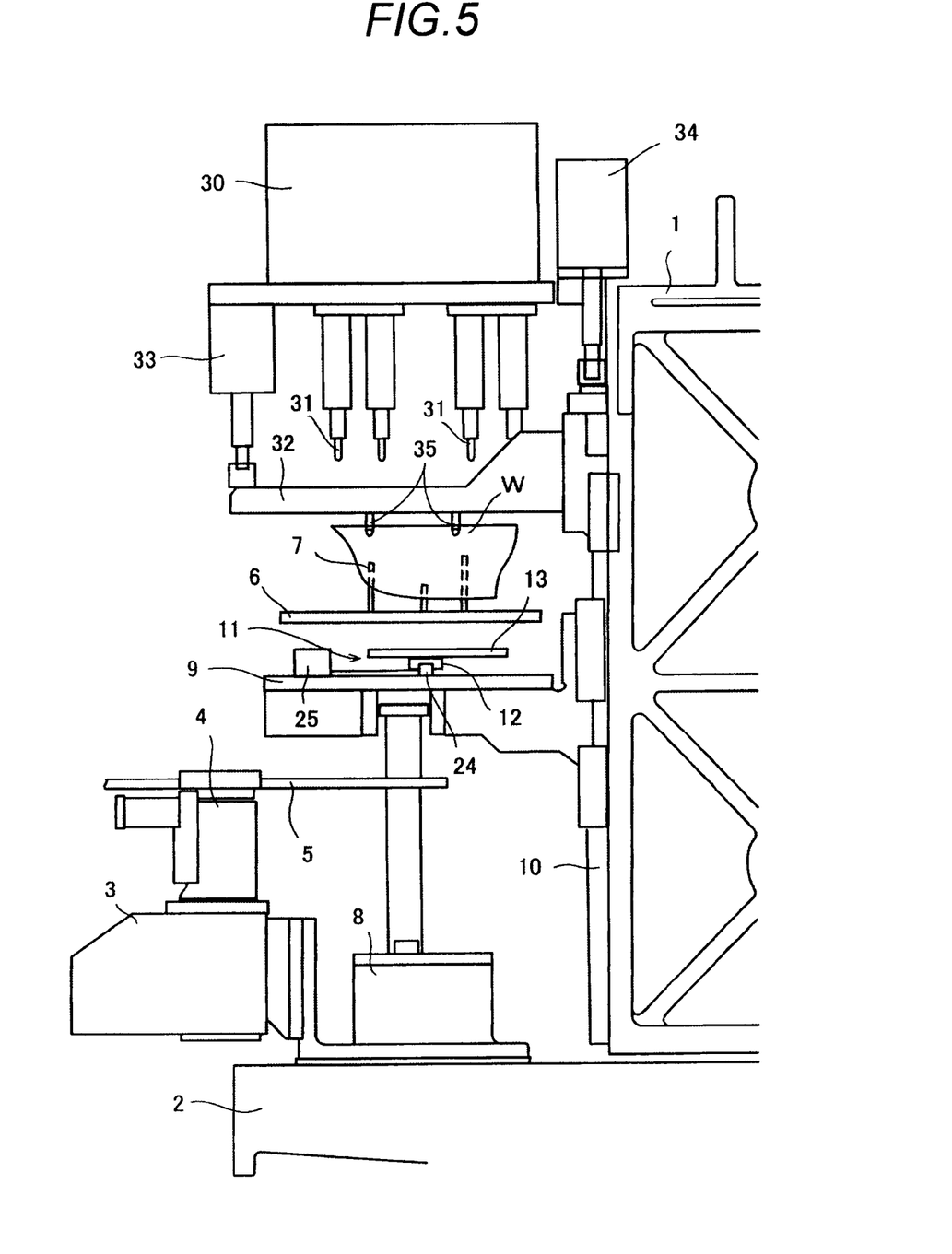
[FIG. 5] A side view of the machine tool in a processing state.
Figure 6:
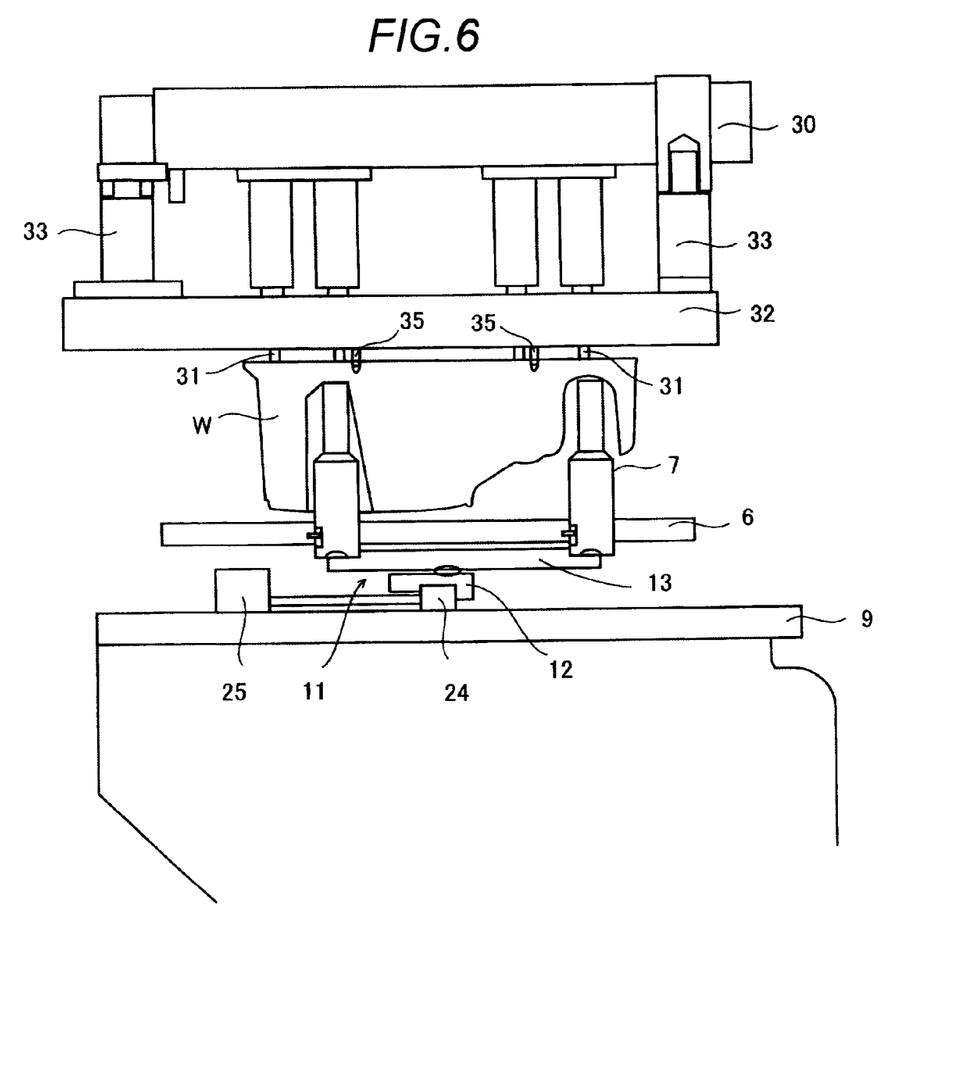
[FIG. 6] A view showing a state that a work is lifted up from a position shown in FIG. 5 and then processed.

An exemplary embodiment of the invention will be explained with reference to the drawings. FIG. 1 is a general perspective view of a machine tool according the exemplary embodiment of the present invention. FIG. 2 is a side view of the machine tool in a standby state. FIG. 3 is an enlarged view showing a state that a pallet is set to a base plate. FIG. 4 is a front view of the machine tool in a standby state. FIG. 5 is a side view of the machine tool in a processing state. FIG. 6 is a view showing a state that a work is lifted up from a position shown in FIG. 5 and then processed.

In the machine tool, a protruded base portion 2 is provided to a bottom portion of a frame 1 to protrude forward, and a turntable 3 is fitted to an end of the protruded base portion 2. Respective arms 5 that are different in phase by 180° are fitted to a shaft 4, which is turned by a motor, of the turntable 3. When the arms 5 are turned on a horizontal plane, a work piece W arranged on a pallet 6 via positioning pins 7 is loaded/unloaded on/from the machine tool.

A cylinder unit 8 is provided vertically to an upper surface of the protruded base portion 2. A base plate 9 is coupled to a top end of the rod of this cylinder unit 8. The base plate 9 is engaged with rails 10 provided vertically to a side surface of the frame 1. The base plate 9 is moved up and down when the cylinder unit 8 is driven.

A holding plate mechanism 11 for supporting the pallet 6 to tilt with respect to a machining axis L is provided on the base plate 9. The holding plate mechanism 11 consists of a lower plate 12 and two sheets of upper plates 13, 13 arranged over the lower plate 12. A shaft 14 provided upright to the base plate is passed through the lower plate 12, and the lower plate 12 is supported by a coned disc spring 15 being arranged around the shaft 14 such that such lower plate 12 is floated slightly from the base plate 9. A gimbal mechanism (first gimbal mechanism) including a convex spherical surface receiving portion 16 and a concave spherical surface receiving portion 17 is interposed between the coned disc spring 15 and the lower plate 12. The lower plate 12 can be moved around a portion of the gimbal mechanism while tilting to the machining axis L.

The upper plates 13, 13 are supported in a reverse tree shape with respect to the lower plate 12. Specifically, shafts 18, 18 are provided to right and left end portions of the lower plate 12, and the upper plates 13, 13 are passed through the shafts 18, 18 with plays respectively therebetween. The upper plates 13, 13 are supported to by shafts 18, 18 via respective gimbal mechanisms (second gimbal mechanisms). Each of the second gimble mechanisms includes a convex spherical surface receiving portion 19 and a concave spherical surface receiving portion 20. Therefore, the upper plates 13, 13 are movable around respective gimbal mechanisms while tilting to the machining axis L. Further, tilting movements of the upper plates 13, 13 are restricted by stopper bolts 21 provided to the base plate 9.

A sheet of pallet 6 is put on two sheets of upper plates 13, 13. The positioning pins 7 are provided to the pallet 6, as described above. In the embodiment, six positioning pins 7 are passed through the pallet 6. The positioning pins are respectively retained by stoppers 22 (retaining mechanisms 22).

In FIG. 3, out of six positioning pins 7, three pins on the left side support a left half body WL of a transmission case W, and three pins on the right side support a right half body WR of the transmission case W. Both the left half body WL and the right half body WR of the transmission case W are supported by the positioning pins 7 to direct their aligned surfaces as the reference plane upwardly.

Three convex portions 23 are provided to upper surfaces of the upper plates 13, 13 respectively, and the upper plates 13, 13 are supported in a state that bottom surfaces of the positioning pins 7 are put on respective convex portions 23. That is, the pallet 6 is not directly put on the upper surfaces of the upper plates 13, 13 but the pallet 6 is floated slightly from the upper plates 13, 13 in a free state. As a result, the left half body WL of a transmission case W is supported directly on the left-side upper plate 13 via three positioning pins 7 on the left side to tilt, while the right half body WR of the transmission case W is supported directly on the right-side upper plate 13 via three positioning pins 7 on the right side to tilt.

Also, wedge members 24 (lock mechanisms 24) are arranged on the base plate 9. When the wedge members 24 are inserted between the base plate 9 and the lower plate 12 by driving a cylinder unit 25, the lower plate 12 is locked in a predetermined position.

A machining unit 30 is arranged over the base plate 9. The machining unit 30 is fixed to the upper portion of the frame 1 and is equipped with a plurality of machining tools 31.

An intermediate plate 32 is arranged between the base plate 9 and the machining unit 30. The intermediate plate 32 is coupled to a rod lower end of an air cylinder unit 33, which is provided to a top end portion of the machining unit 30 to move its rod vertically, and a rod lower end of an air cylinder unit 34, which is provided to an upper end portion of the frame 1 to move its rod vertically, and is engaged with the rails 10. Therefore, when a pushing force is applied upward to the intermediate plate 32, the intermediate plate 32 is lifted along the rails 10 while compressing the air cylinder units 33, 34.

Positioning pins 35, 35 are projected downward from a lower surface of the intermediate plate 32. In the present embodiment, one positioning pin 35 engages with a part of the left half body WL of the transmission case W to position the left half body WL of the transmission case, while the other positioning pin 35 engages with a part of the right half body WR of the transmission case W to position the left half body WR of the transmission case.

Next, an example of the machining method using the machine tool constructed as above will be explained hereunder.

First, a state in FIG. 2 will be explained as a starting point. In this state, the arms 5 of the turntable 3 hold the pallet 6 from the bottom, and the transmission case W (the left and right half bodies) is set on the pallet 6. Also, in this state, the cylinder unit 8 is in its compressed state and the base plate 9 is positioned below the arms 5 that are holding the pallet 6.

The cylinder unit 8 is expanded from this state. Then, the base plate 9 is lifted, and then the right, left upper plates 13, 13 constituting the holding plate mechanism 11 provided on the base plate 9 receive the pallet 6 from the arms 5. Concretely, as described above, the convex portions 23 provided on the upper surfaces of the upper plates 13, 13 contact the lower ends of the positioning pins 7 and then lift the transmission case W (the left and right half bodies) via the positioning pins 7, and the pallet 6 is held by the positioning pins 7 in a free condition.

When the cylinder unit 8 is expanded, a part of respective reference planes (upper planes) of the left and right half bodies WL, WR of the transmission case W comes into contact with the positioning pins 35 of the intermediate plate 32 from the bottom. In this state, the left and right half bodies WL, WR of the transmission case W are supported by the left and right upper plates 13, 13 constituting the holding plate mechanism 11 individually. Therefore, an exact positioning of the transmission case W can be achieved because respective upper plates 13, 13 are tilted by a reaction force that is applied from the intermediate plate 32.

After the above positioning is completed, the wedge members 24 are inserted between the base plate 9 and the lower plate 12 by driving the cylinder unit 25, and then locked. In this state, the upper plates 13, 13 constituting the holding plate mechanism 11 can also be tilted, nevertheless the upper plates 13, 13 are not tilted because they are pressed by the positioning pins 35 from the top.

The left and right half bodies WL, WR of the transmission case W are lifted up to the machining position by expanding the cylinder unit 8, and they are worked by the machining tool 31 of the machining unit 30. Then, the worked transmission case W is transferred to the arms 5 of the turntable 3 by the operations opposite to the above operations every pallet, and the operation is completed.

It will be apparent to those skilled in the art that various modifications and variations can be made to the described exemplary embodiment of the present invention without departing from the spirit or scope of the invention. Thus, it is intended that the present invention cover all modifications and variations of this invention consistent with the scope of the appended claims and their equivalents.

DESCRIPTION OF REFERENCE NUMERALS AND SIGNS 1 frame, 2 projection portion, 3 turntable, 4 shaft of the turntable, 5 arm, 6 pallet, 7 positioning pin of the pallet, 8 cylinder unit, 9 base plate, 10 rail, 11 holding plate mechanism, 12 lower plate, 13 upper plate, 14 shaft provided upright to the base plate, 15 coned disc spring, 16 convex spherical surface receiving portion, 17 concave spherical surface receiving portion, 18 shaft provided to the lower plate, 19 convex spherical surface receiving portion, 20 concave spherical surface receiving portion, 21 stopper bolt, 22 stopper, 23 convex portion, 24 wedge member, 25 cylinder unit, 30 machining unit, 31 machining tool, 32 intermediate plate, 33, 34 air cylinder unit, 35 positioning pin, L machining axis, W transmission case, WL, WR transmission case half body

What is claimed is:
1. A machine tool comprising:
a machining unit fixed to a frame;
a base plate movable along a rail on the frame, for moving a work piece toward and away from the machining unit;
an intermediate plate movable along the rail between the machining unit and the base plate, for pushing a reference plane of the work piece set on the base plate and positioning the work piece in a machining position;
a lower plate disposed between the base plate and the intermediate plate, the lower plate having a lower plate concave spherical surface receiving portion;
a lower convex spherical surface receiving portion disposed between the lower plate and the base plate, the lower convex spherical surface cooperating with the lower plate concave spherical surface receiving portion to tiltably connect the lower plate to the base plate;
a pair of upper plates disposed between the lower plate and the intermediate plate, each of the upper plates defining an upper plate concave spherical surface receiving portion; and
a pair of upper convex spherical surface receiving portions disposed between the lower plate and the respective upper plates, the upper convex spherical surface receiving portions cooperating with the upper plate concave spherical surface receiving portions to tiltably connect the respective upper plate to the lower plate.

2. The machine tool according to claim 1, further comprising:
a pallet, wherein the work piece is supported on the pallet via a positioning pin.

3. The machine tool according to claim 1, further comprising:
a lock mechanism provided between the base plate and the lower plate, for locking a movement of the lower plate.

4. The machine tool according to claim 1, further comprising:
a pallet on which the work piece is set; and
a positioning pin penetrating through the pallet, wherein the positioning pin is supported by a retaining mechanism.

5. The machine tool according to claim 4, further comprising:
a convex portion provided on an upper face of the upper plates, wherein the upper face of the upper plates faces away from the lower plate and the convex portion supports the positioning pin.

6. The machine tool according to claim 1, further comprising:
stopper bolts extending between the base plate and the upper plates, the stopper bolts allowing restricted tilting between the base plate and the upper plates.

7. The machine tool according to claim 1, further comprising:
a shaft extending from the base plate toward the lower plate; and
a coned disc spring coaxially received on the shaft, the coned disc spring biasing the lower plate toward the upper plates.

8. The machine tool according to claim 1, further comprising:
a protruded base portion extending from a bottom portion of the frame;
frame rails vertically extending along the frame, the rails engaging the base plate; and
a cylinder unit provided on the protruded base portion, the cylinder unit being operable to move the base plate toward the intermediate plate.

9. A machine tool comprising:

a machining unit fixed to a frame;

a base plate movable along a rail on the frame, for moving a work piece toward and away from the machining unit; and a holding plate mechanism provided on the base plate, for supporting a pallet on which the work piece is set, wherein the holding plate mechanism includes a lower plate and a pair of upper plates, the lower plate is connected to the base plate via a first gimbal mechanism so as to be tiltable with respect to a machining axis, and the pair of upper plates are respectively connected to the lower plate via second gimbal mechanisms so as to be tiltable with respect to the machining axis.

10. The machine tool according to claim 9, further comprising:

a lock mechanism provided between the base plate and the lower plate, for locking a movement of the lower plate.

11. The machine tool according to claim 9, further comprising:

a positioning pin penetrating through the pallet, wherein the positioning pin is supported by a retaining mechanism.

12. The machine tool according to claim 11, further comprising:

a convex portion provided on an upper face of the upper plates, wherein the upper face of the upper plates faces away from the lower plate and the convex portion supports the positioning pin.

13. The machine tool according to claim 9, further comprising:

stopper bolts extending between the base plate and the upper plates, the stopper bolts allowing restricted tilting between the base plate and the upper plates.

14. The machine tool according to claim 9, further comprising:

a shaft extending from the base plate toward the lower plate; and a coned disc spring coaxially received on the shaft, the coned disc spring biasing the lower plate toward the upper plates.

15. The machine tool according to claim 9, further comprising:

a protruded base portion extending from a bottom portion of the frame;

frame rails vertically extending along the frame, the rails engaging the base plate; and a cylinder unit provided on the protruded base portion, the cylinder unit being operable to move the base plate toward the intermediate plate.

* * * * *